(12) United States Patent
Wills

(10) Patent No.: US 8,960,621 B2
(45) Date of Patent: Feb. 24, 2015

(54) SLIDE LOCK FOR A ROLLER BLIND FASCIA

(71) Applicant: Norman Wills, Mississauga (CA)

(72) Inventor: Norman Wills, Mississauga (CA)

(73) Assignee: ZMC Metal Coating Inc., Ontario (CA)

( * ) Notice: Subject to any disclaimer, the term of this patent is extended or adjusted under 35 U.S.C. 154(b) by 0 days.

(21) Appl. No.: 13/941,133

(22) Filed: Jul. 12, 2013

(65) Prior Publication Data

US 2015/0014501 A1    Jan. 15, 2015

(51) Int. Cl.
*A47H 1/10* (2006.01)
*E04G 3/00* (2006.01)
*E06B 9/00* (2006.01)
*F16B 5/06* (2006.01)

(52) U.S. Cl.
CPC ............ *F16B 5/0614* (2013.01); *Y10S 160/902* (2013.01)
USPC ... 248/266; 248/267; 248/205.1; 248/222.11; 248/251; 248/229.16; 248/229.26; 248/208; 248/268; 248/273; 160/19; 160/23.1; 160/238; 160/368.1; 160/369; 160/38; 160/902; 24/289

(58) Field of Classification Search
CPC ............ A47H 1/10; A47H 7/00; A47H 7/02; A47H 2023/00; A47H 2023/003; A47H 2001/06; A47H 99/00; A47H 2/00
USPC ................ 248/266–267, 205.1, 222.11, 251, 248/229.16, 229.26, 208, 268, 273; 160/19, 160/23.1, 238, 368.1, 369, 38, 902; 24/289
See application file for complete search history.

(56) References Cited

U.S. PATENT DOCUMENTS

| 5,330,821 | A | * | 7/1994 | Lo ................................ 428/120 |
| 5,520,234 | A | * | 5/1996 | Simmons ........................ 160/38 |
| 7,516,771 | B2 | * | 4/2009 | Drew et al. ............... 160/173 R |
| 8,480,048 | B2 | * | 7/2013 | Krantz-Lilienthal ......... 248/267 |
| 2006/0289120 | A1 | * | 12/2006 | Pielmeier ..................... 160/23.1 |
| 2011/0006176 | A1 | * | 1/2011 | Krantz-Lilienthal ...... 248/205.1 |

* cited by examiner

*Primary Examiner* — Christopher Garft
(74) *Attorney, Agent, or Firm* — Merek, Blackmon & Voorhees, LLC

(57) ABSTRACT

A slide lock to releasably secure a roller blind fascia to the end plate of a roller blind. The slide lock comprises a lock body slidably received along an interior surface of the fascia. The lock body has an engaged position, where the lock releasably secures the fascia to the roller blind end plate, and has a disengaged position, where the lock releases the fascia from the end plate to permit the fascia to be removed therefrom. The lock body includes a flexibly resilient leg member that releasably engages between the fascia and the roller blind end plate. The leg member includes a deflection zone such that when the leg member engages between the fascia and the roller blind end plate at least a portion of the leg member is compressed or deflected about the deflection zone to releasably secure the lock body between the roller blind end plate and the fascia, thereby releasably securing the fascia to the end plate.

9 Claims, 9 Drawing Sheets

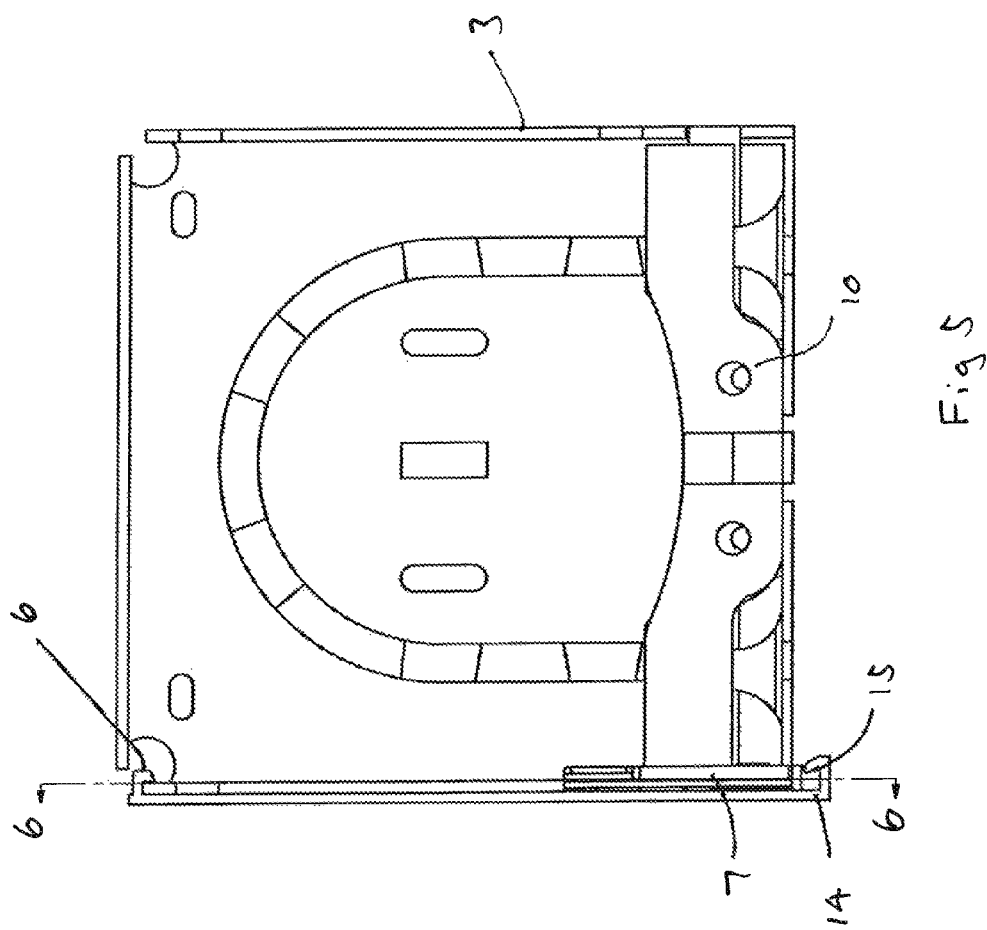

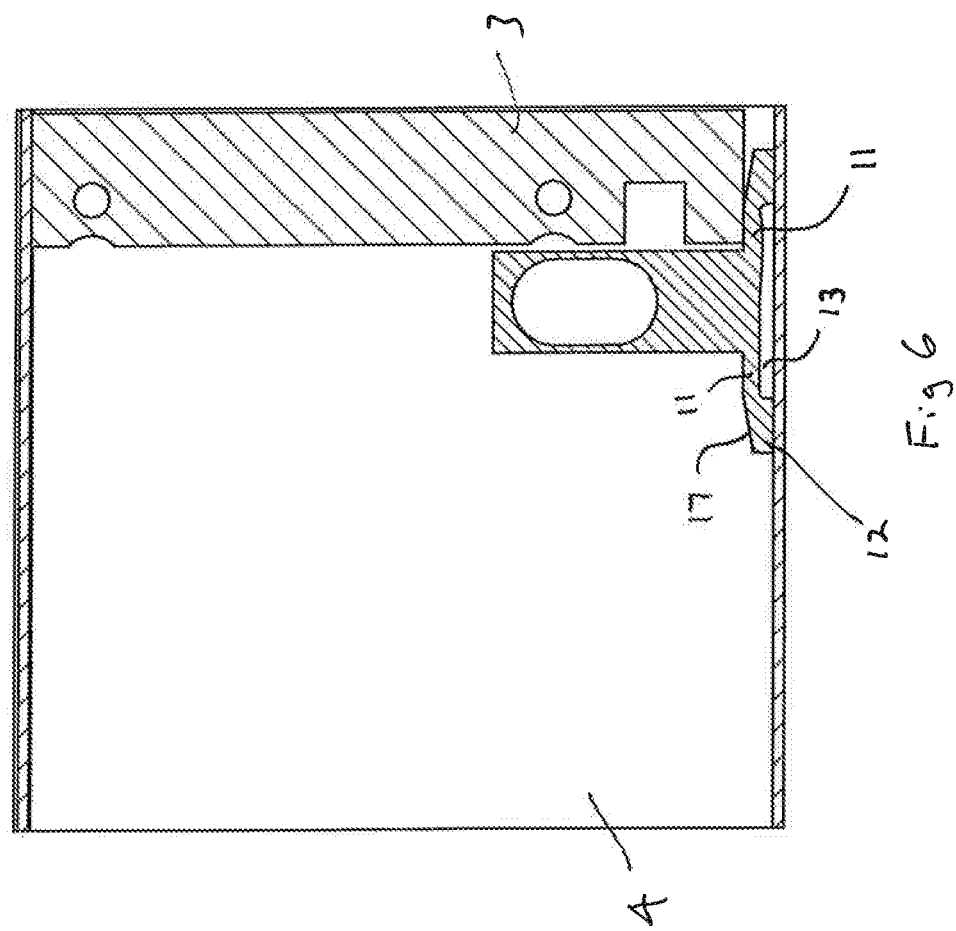

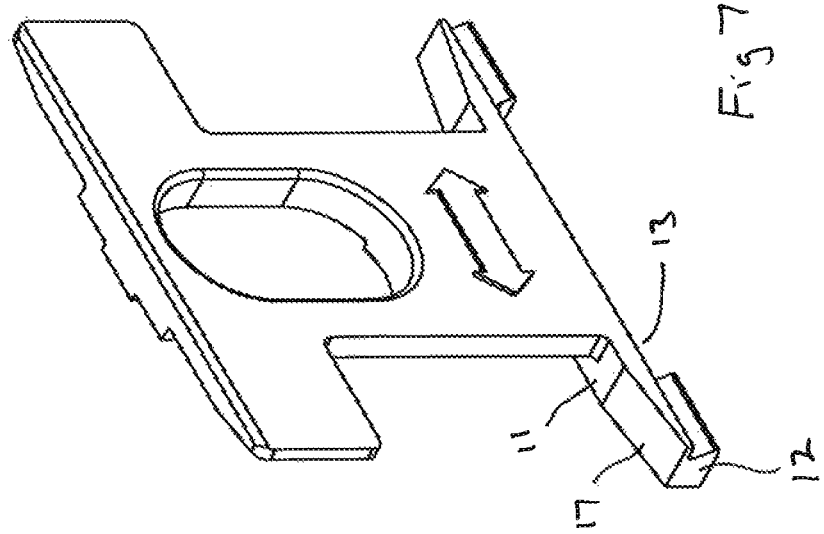

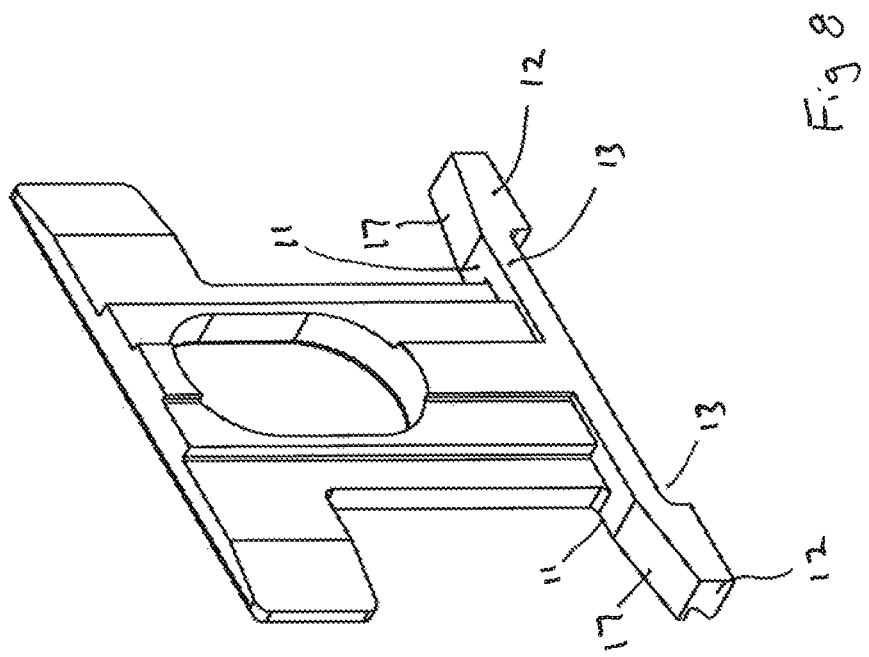

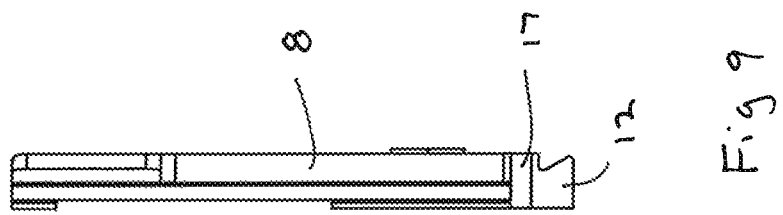

SLIDE LOCK FOR A ROLLER BLIND FASCIA

FIELD

This invention relates to a slide lock for use in associate with a roller blind fascia.

BACKGROUND

Roller blinds, or roller shades as they are sometimes referred to, are commonly mounted on windows for privacy purposes and to limit light intrusion. Roller blinds typically include a length of blind fabric wound about a roller tube that is positioned between a pair of end brackets, which are in turn secured within or about a window frame. For aesthetic purposes, a fascia (or trim panel) is typically mounted on the front of the blind in order to obscure the roller tube, and much of the mechanical mechanism that operates the blind, from view.

A variety of different mechanical structures have been proposed for use in securing the fascia to remainder of the blind. Unfortunately, many of the structures that have been proposed to date are either cumbersome to use or exhibit a tendency for the fascia to become loose during repeated operation of the blind and to potentially become dislodged and fall from its position about the window or window frame. Many of the more robust securing mechanisms have tended to be somewhat mechanically complex, and at times provide installers with difficulty in manipulating the securing mechanisms within tight quarters to either secure or remove the fascia. In still other instances the mechanical structures that are utilized to hold the fascia in place involve clips that at least partially engage the outer front surface of the fascia, presenting a less than desirable aesthetic look.

SUMMARY

The invention therefore provides a slide lock to releasably secure a roller blind fascia to the end plate of a roller blind, the slide lock comprising a lock body slidably received along an interior surface of the fascia, said lock body having an engaged position, wherein said lock releasably secures the fascia to the roller blind end plate, and having a disengaged position, wherein said lock releases the fascia from the end plate to permit the fascia to be removed therefrom, said lock body including a flexibly resilient leg member that releasably engages between the fascia and the roller blind end plate, said leg member including a deflection zone such that when said leg member engages between the fascia and the roller blind end plate at least a portion of said leg member is compressed or deflected about said deflection zone to releasably secure said lock body between the roller blind end plate and the fascia, thereby releasably securing the fascia to the end plate.

In a further aspect the invention provides a slide lock to releasably secure a roller blind fascia to the end plate of a roller blind, the slide lock comprising a lock body slidably received along an interior surface of the fascia, said lock body having an engaged and a disengaged position, when in said engaged position said lock body releasably securing the fascia to the roller blind end plate, when in said disengaged position said lock body releasing the fascia from the end plate to permit the fascia to be removed therefrom, said lock body including at least one flexibly resilient leg member, said leg member including a deflection zone comprising an undercut portion of said leg member, said leg member releasably engaging between the roller blind end plate and the fascia such that at least a portion of said leg member is deflected about said deflection zone, whereby the resiliency of said leg member causes said lock body to be releasably secured between the roller blind end plate and the fascia, thereby releasably securing the fascia to the end plate.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 5 is a vertical sectional view taken along the line 5-5 of FIG. 3.

FIG. 6 is a vertical sectional view taken along the line 6-6 of FIG. 5.

FIG. 7 is an upper front perspective view of the slide lock shown in FIG. 2.

FIG. 8 is an upper rear perspective view of the slide lock shown in FIG. 7.

FIG. 9 is a side elevational view of the slide lock shown in FIG. 7.

DESCRIPTION

The present invention may be embodied in a number of different forms. The specification and drawings that follow describe and disclose some of the specific forms of the invention.

Figure 1:
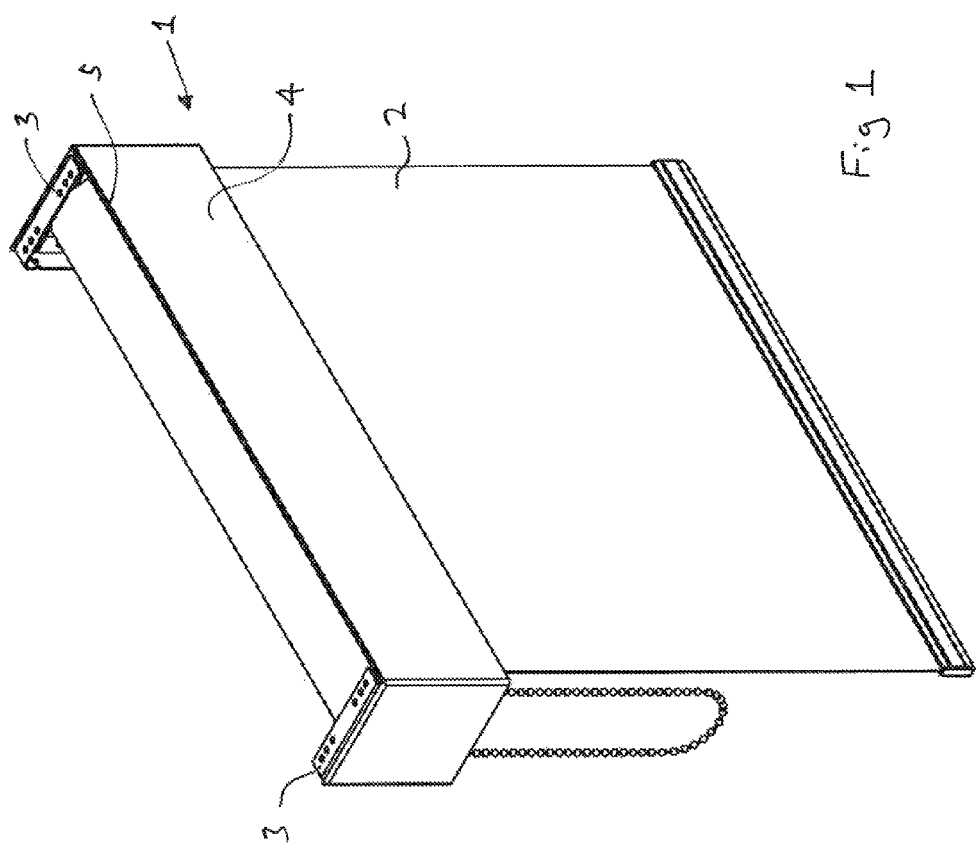
FIG. 1 is a side elevational view of a typical roller blind or roller shade.
Figure 2:
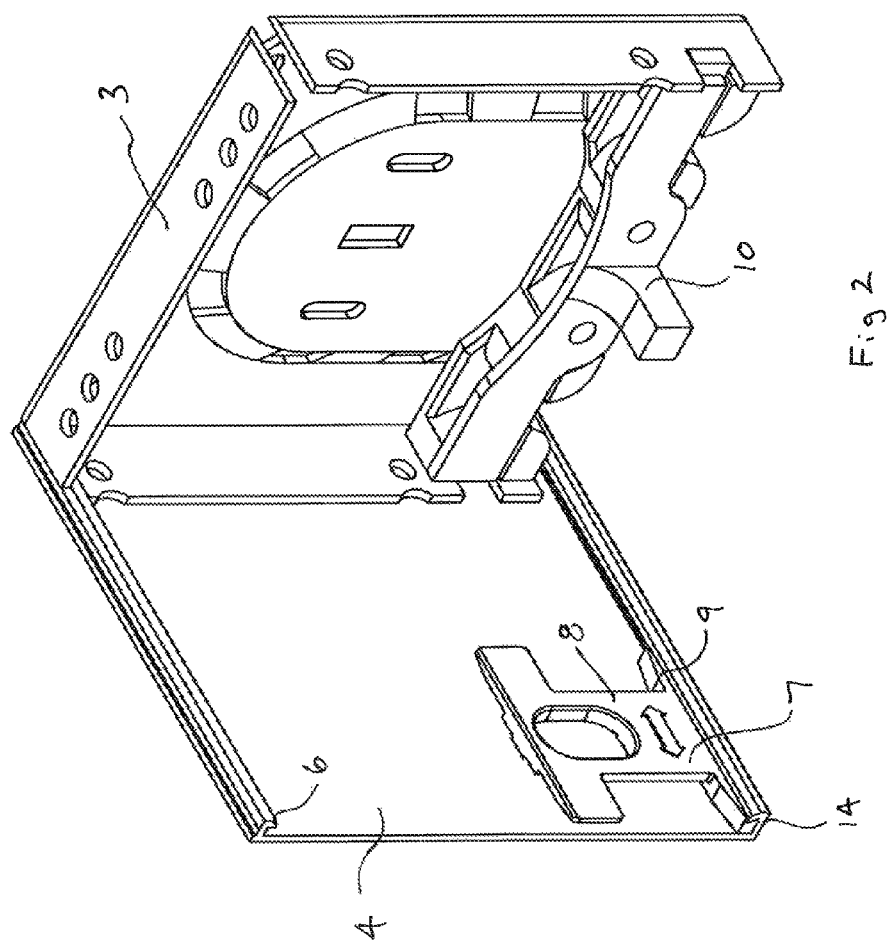
FIG. 2 is an upper rear perspective view of the end bracket of the roller shade shown in FIG. 1 having the roller tube removed and showing the fascia in place but not securely attached thereto.
Figure 3:
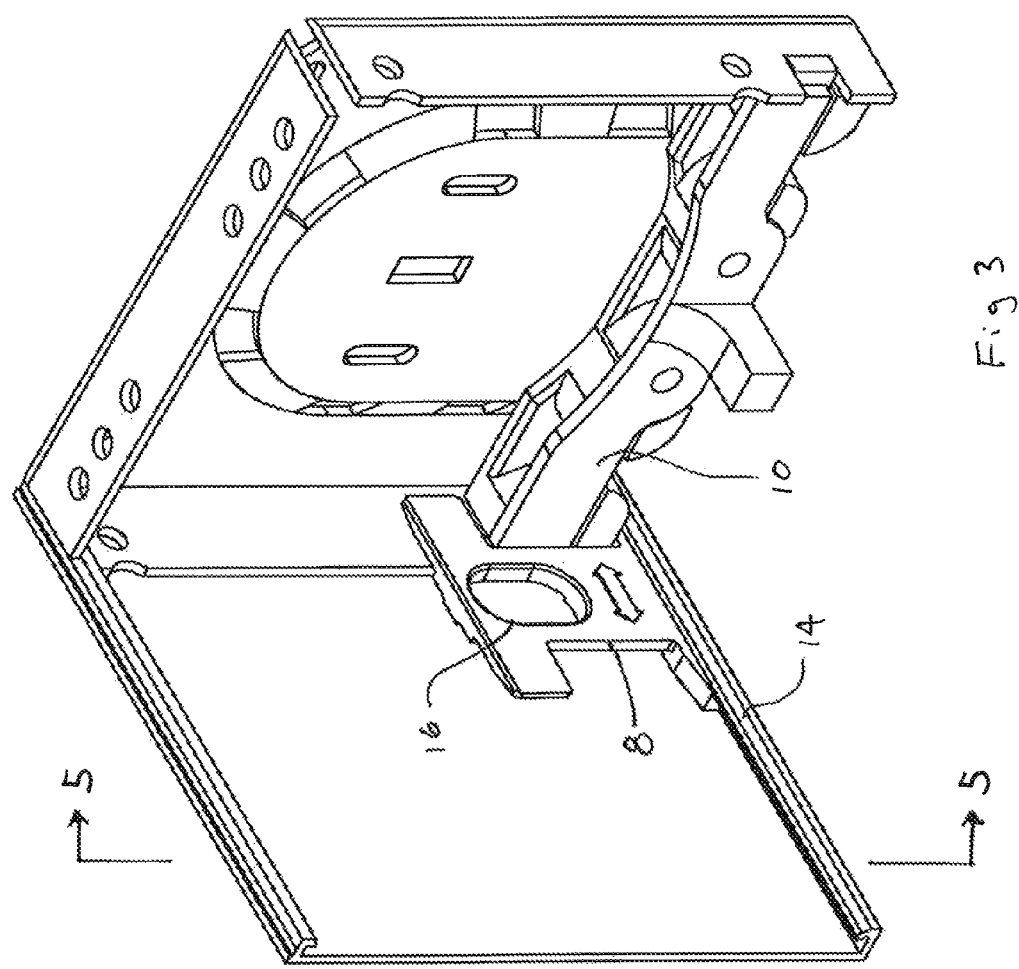
FIG. 3 is a view similar to FIG. 2 wherein the fascia has been locked in place.
Figure 4:
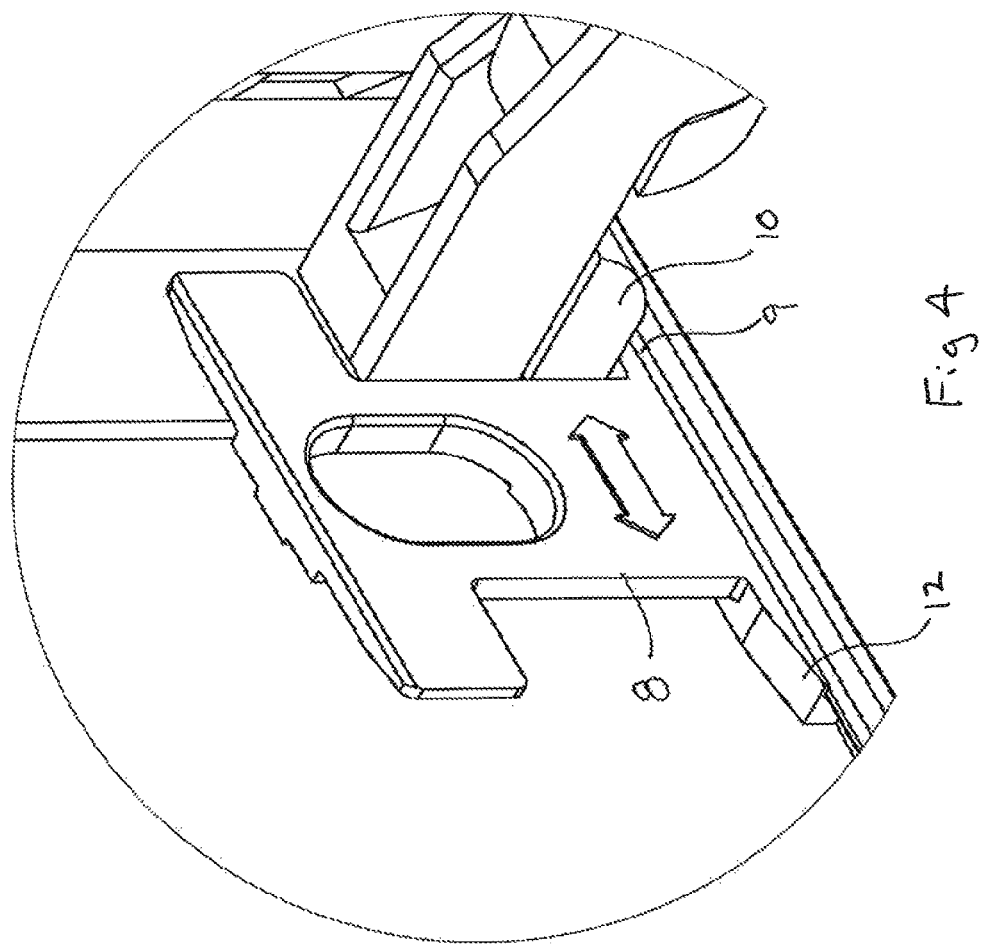
FIG. 4 is an enlarged detail view of the slide lock show in FIG. 3.

With reference to FIG. 1 there is shown a relatively standard roller blind 1 that is comprised generally of blind fabric 2 mounted on a roller tube that is positioned between a pair of end plates 3. A fascia 4 is secured to the end plates to obscure the roller tube and the mechanical mechanism that operates the blind, and to provide a pleasing aesthetic appearance.

FIGS. 2 through 6 show in detail the structure and function of an embodiment of the slide lock in accordance with the present invention. The manner in which fascia 4 is secured to end plates 3 is shown more specifically in FIGS. 2 and 3. Typically, the upper top edge 5 of the fascia will include a hook or lip 6 that is received over an upwardly extending ledge or flange on the end plate to effectively hang the fascia therefrom. To ensure that the fascia does not accidentally become dislodged and fall from the end plates, a slide lock 7 is utilized to lock or releasbly secure the fascia to the end plates. When engaged with an end plate, slide lock 7 holds the fascia in place and prevents the fascia from being lifted upwardly or rotated outwardly in order to dislodge hook or lip 6 from position when hanging from the upper portion of the end plate.

Slide lock 7 is comprised generally of a lock body 8 that is slidably received on the interior surface of fascia 4. The lock body has an engaged position (see FIG. 3), where it releasably secures the fascia to the end plate, and also has a disengaged position (see FIG. 2) where the lock releases the fascia from the end plate to permit the fascia to be rotated and/or lifted so as to allow hook 6 to be released from its engagement with the top of the end plate. At that point the fascia can be removed to be cleaned or to allow for servicing of the interior components of the roller blind.

Lock body 8 includes a flexibly resilient leg member 9 that releasably engages an end plate 3. In the example shown in the attached drawings, the end plate includes a chain guide 10 which, in this embodiment of the invention, represents the portion of the end plate that is engaged by leg member 9.

As is best shown in FIG. 6, leg member 9 includes a deflection zone 11 such that when the leg member engages the end plate (or in this example chain guide 10) at least a portion of the leg member is deflected or compressed about deflection zone 11 to releasably secure the lock body between the roller blind end plate and the fascia, thereby releasably securing the fascia to the end plate. In the embodiment of the invention shown in the attached drawings leg member 9 includes a foot portion 12 that is located laterally outwardly from deflection zone 11. The deflection zone is shown as an undercut portion 13 of leg member 9 such that that portion of the leg member positioned between the lock body and foot portion 12 is effectively thinner and is off-set from fascia 4. It will further be appreciated that in an alternate embodiment of the invention deflection zone 11 may be comprised of a resilient compressible material rather than being in the form of undercut portion 13.

Lock body 8 is preferably slidably received within a longitudinal channel 14 located on the interior surface of fascia 4. In the attached drawings (see FIG. 5) channel 14 includes an undercut slot 15 with foot portion 12 of leg member 9 having a corresponding shape which permits the receipt of the foot portion within the channel. Such a structure allows for a longitudinal sliding movement of the lock body, while preventing the lock body from being lifted vertically out of the channel. From an appreciation of the description that follows, it will be understood that foot portion 12 thus permits the slide lock to be slidably received within channel 14 along the interior surface of fascia 4, which in turn permits the lock to engage and disengage the end plate in order to releasably secure the fascia thereto.

Lock body 8 may include two leg members 9 disposed laterally in opposite directions, with each of the leg members including a foot portion that similarly engages the longitudinal channel in the fascia. Constructing the lock body in this manner enables the slide lock to be universal in nature such that it can releasably engage the end plate at either end of the roller blind. Where two leg members extending in opposite directions are utilized, undercut portion 13 may extend from one of the foot portions to the other foot portion. In most instances it is expected that two identical slide locks would be inserted into the horizontal channel on the fascia, with one of the locks engaging each of the respective end plates. Lock body 8 may include a finger tab or finger hole 16 to help facilitate sliding the lock body along the length of fascia 4.

With specific reference to FIG. 6, in the embodiment shown foot portion 12 is generally wedge-shaped in vertical cross-section with a top surface that slopes upwardly in a direction toward the lock body. The shape of the upper surface of the foot portion helps to facilitate the engagement of the leg member between the end plate and the fascia as the lock body is slid along channel 14 in a direction toward the end plate. In one embodiment, the upper surface of foot portion 12 may include ribs, serrations or other friction enhancing measures to enhance its engagement with the end plate. The distance that the upper surface 17 of leg member 9 is off-set from the upper surface of channel 14 (i.e. the height of the leg member) will be greater than the distance between the upper surface of the channel and the lower surface of that portion of the end plate engaged by the leg member. Accordingly, as the lock body is slid toward the end plate, foot portion 12 will first be received between the end plate and the fascia. The wedge shape of the foot portion will help to facilitate its receipt between the end plate and the fascia. Further movement of the lock body toward the end plate will cause the end plate to bear against the upper surface 17 of the leg member 9. The height of the leg member (ie its set-off from channel 14) is greater than the distance between the upper surface of the channel and the lower surface of that portion of the end plate which contacts the leg member, such that forcing the lock body further toward the end plate will cause a "wedging" of the leg member between the fascia and the end plate. Undercut portion 13 will effectively cause the leg member to deflect downwardly in deflection zone 11. The resiliency of the lock body, and in particular the leg member, will establish a force between the leg member, the end plate and channel 14. The slide lock will thus be securely held between channel 14 and the end plate, resulting in a holding of the fascia in place about the end plate.

In most instances it is expected that the lock body will be formed from a flexibly resilient nylon, polypropylene, polyethylene or other plastic or similar material. However, in some cases the lock body could also be constructed from a steel or other flexibly resilient metal. In either case, the deflection (or compression where the leg member includes a compressible material) of the leg member and its resiliency will establish a force that will tend to effectively push channel 14 on the fascia in a downward direction relative the end plate, thereby securing the fascia to the end plate by preventing hook 6 from the being disengaged from the end plate.

It is to be understood that what has been described are the preferred embodiments of the invention. The scope of the claims should not be limited by the preferred embodiments set forth above, but should be given the broadest interpretation consistent with the description as a whole.

I claim:

1. A slide lock to releasably secure a roller blind fascia to an end plate of a roller blind, the slide lock comprising:
a lock body slidably received along an interior surface of the fascia, said lock body having an engaged position, wherein said lock body releasably secures the fascia to the roller blind end plate, and having a disengaged position, wherein said lock body releases the fascia from the end plate to permit the fascia to be removed therefrom, said lock body including two leg members laterally disposed in opposite directions, each of said leg members including a flexibly resilient foot portion that slidably engages a longitudinal channel on the interior surface of the fascia thereby securing said lock body to the facia, one of said leg members releasably engageable between the fascia and the roller blind end plate and having a deflection zone such that when said leg member engages between the fascia and the roller blind end plate at least a portion of said leg member is compressed or deflected about said deflection zone to releasably secure said lock body between the roller blind end plate and the fascia, thereby releasably securing the fascia to the end plate.

2. The slide lock as claimed in claim 1 wherein said foot portion of said leg member is located laterally outwardly from said deflection zone.

3. The slide lock as claimed in claim 2 wherein said deflection zone is an undercut portion of said leg member.

4. The slide lock as claimed in claim 2 wherein the channel on the fascia includes an undercut slot, said foot portion having a corresponding shape permitting the receipt of said foot portion within the channel.

5. The slide lock as claimed in claim 4 wherein said lock body includes a finger tab or finger hole to permit said lock body to be grasped and slid along the channel in the fascia.

6. The slide lock as claimed in claim 1 wherein said lock body is formed from a flexibly resilient nylon, polyethylene, polypropylene or other plastic material.

7. The slide lock as claimed in claim 1 wherein said deflection zone is comprised of a compressible material such that when said leg member engages between the fascia and the roller blind end plate at least a portion of said leg member is compressed, the resiliency of said leg member about said compressed portion releasably securing said lock body between the roller blind end plate and the fascia.

8. A slide lock to releasably secure a roller blind fascia to an end plate of a roller blind, the slide lock comprising:

a lock body slidably received along a longitudinal channel on an interior surface of the fascia, said lock body having an engaged and a disengaged position, when in said engaged position said lock body releasably securing the fascia to the roller blind end plate, when in said disengaged position said lock body releasing the fascia from the end plate to permit the fascia to be removed therefrom, said lock body including two flexibly resilient leg members laterally disposed in opposite directions that slidably engage the channel on the interior surface of the fascia to secure said lock body to the facia, each of said leg members including a deflection zone comprising an undercut portion, one of said leg members releasably engaging between the roller blind end plate and the fascia such that at least a portion of said leg member is deflected about said deflection zone, whereby the resiliency of said leg member causes said lock body to be releasably secured between the roller blind end plate and the fascia, thereby releasably securing the fascia to the end plate.

9. The slide lock as claimed in claim 8 wherein the channel includes an undercut slot that receives a correspondingly shaped portion of said leg members permitting said lock body to be slidably secured to the fascia.

* * * * *